(12) United States Patent
Angeleri

(10) Patent No.: US 6,857,257 B2
(45) Date of Patent: Feb. 22, 2005

(54) METHOD FOR CULTIVATING LEAFY VEGETABLES

(75) Inventor: Mauro Angeleri, Castelnuovo Scrivia (IT)

(73) Assignee: Agricompany S.S., Castelnuovo Scrivia (IT)

(*) Notice: Subject to any disclaimer, the term of this patent is extended or adjusted under 35 U.S.C. 154(b) by 135 days.

(21) Appl. No.: 10/169,151

(22) PCT Filed: Dec. 19, 2000

(86) PCT No.: PCT/IT00/00535
§ 371 (c)(1),
(2), (4) Date: Oct. 29, 2002

(87) PCT Pub. No.: WO01/47344
PCT Pub. Date: Jul. 5, 2001

(65) Prior Publication Data
US 2003/0116067 A1 Jun. 26, 2003

(30) Foreign Application Priority Data
Dec. 27, 1999 (IT) ........................... AL99A0011

(51) Int. Cl.⁷ .............................................. A01D 45/00
(52) U.S. Cl. .................. 56/327.1; 56/DIG. 2; 111/200; 111/900; 111/919; 47/78
(58) Field of Search ................................ 111/200, 900, 111/199, 915, 918, 919; 47/1.01 R, 26, 78, 77, 73, 56, 58.1, 904; 56/1, 327.1, DIG. 2

(56) References Cited

FOREIGN PATENT DOCUMENTS

| EP | 0 848 904 A1 | 6/1998 |
| FR | 2 703 212 A1 | 10/1994 |
| NL | 9400324 A | 10/1995 |

*Primary Examiner*—Christopher J. Novosad
(74) *Attorney, Agent, or Firm*—Browdy and Neimark, P.L.L.C.

(57) ABSTRACT

The present invention relates to a method for cultivating leafy vegetables such as spinach, lettuce and the like, according to which a net (3) with meshes which are smaller in size than the overall volume of the leafy body of the fully grown vegetables is spread over the surface of the cultivation bed. The cultivation method according to the present invention offers the considerable advantage that the vegetables, once the roots have been cut, may be retrieved, amassed or in any case simply harvested by raising the net from the ground, without any risk that the quality or integral nature of the vegetables may be adversely affected in any way.

19 Claims, 4 Drawing Sheets

METHOD FOR CULTIVATING LEAFY VEGETABLES

TECHNICAL FIELD

The present invention relates to a method for cultivating leafy vegetables such as spinach, lettuce, etc.

In particular, the present invention relates to a method for cultivating leafy vegetables, characterized in that it comprises, in addition to certain steps already known in agriculture such as sowing and harvesting, a step involving spreading, over the surface of the cultivation bed, a net having meshes which are smaller in size than the overall volume of the leafy body of the fully grown vegetables so as to allow retrieval and amassing of the vegetables by raising the net from the ground and if necessary rolling up the net.

It is known that even today, despite advanced mechanisation and the widespread availability of even very complex equipment, many operations involved in the cultivation of leafy vegetables require the use of labour on a huge scale.

This is true in particular with regard to the operation of harvesting since the equipment available today does not always ensure the results which are hoped for in terms of product quality; very often, in fact the vegetables which are harvested mechanically do not reach the standards of quality required for retail sale or in any case direct consumption (i.e. as fresh vegetables) and must be frozen or canned or in any case undergo industrial processing in general.

BACKGROUND ART

This is the case, for example, of so-called blade harvesting machines, of the type described in the patent U.S. Pat. No. 4,204,386. The use of machines of this type allows, also in the case of large surface areas, the execution of the harvesting operations in relatively short periods of time with a considerable reduction in costs; on the other hand, this system of harvesting damages considerably the integral nature of the vegetables which, in terms of appearance and quality, are substandard and therefore can be sold only at prices which are unsatisfactory or even, as mentioned further above, may not even be suitable for sale.

Other solutions which are available today, although partially solving the problems posed by the machines of the type described above in that they ensure an end product of acceptable quality, restrict considerably both the range of vegetables which can be cultivated and the type of operations which can be performed.

For example, cultivation methods of the type schematically shown in FIGS. 6a and 6b are known; said systems envisage, in particular, the transplanting the young plants or seedlings 5 through a film 8 of plastic or cellophane spread beforehand over the cultivation bed; the "clodded" seedlings 5, i.e. with clods of earth around the root system, are planted (see FIG. 6b) by perforating the plastic film 8 so as to allow, during the vegetative cycle, the growth of the leafy body above the film 8 (see FIG. 6a).

The harvesting of the fully grown vegetables is performed by performing in sequence cutting of the roots and retrieval of the film so that the seedlings, imprisoned by the film, are raised from the ground and, once separated from the film, may be arranged in special containers which are in turn despatched for distribution.

The system of harvesting described above allows mechanised harvesting but involves, on the other hand, major drawbacks; for example, sowing may be performed only by means of transplanting of the clodded seedlings, whereas sowing by means of scattering of the seeds is not possible owing to the presence of the plastic film. Moreover, the application of the abovementioned harvesting system for vegetables other than lettuce is not known, while the cultivation of spinach which involves sowing by means of scattering of the seeds is not possible; also, it is not possible to vary, even minimally, the sequence of operations associated with sowing, not even in particular environmental conditions (persistent rain, etc.). In fact, spreading of the film may be performed only in sequence with and at the same time as sowing, such that the versatility of operation is very much limited.

Finally, the high cost of the plastic film and the fairly slow rate of seedling transplantation (4000–5000 clods/hour) increase considerably the cultivation costs.

SUMMARY OF THE PRESENT INVENTION

The object of the present invention is to propose a cultivation method which is able to overcome and solve the problems described above; in particular, the object of the present invention is that of providing a cultivation method which allows, at the same time:

1) rapid and simple harvesting such as to ensure a very high quality of the vegetables;

2) the use of various sowing techniques such as transplanting of the clodded seedlings and scattering of the seeds;

3) the possibility of performing the sowing and/or transplanting operations at different times, depending on the contingent requirements and the state of the ground.

All this is achieved with the cultivation method according to the present invention as defined in the claims, said cultivation method being characterized in that it envisages a step—before, after or at the same time as sowing—involving spreading, over the surface of the cultivation bed, a net having meshes which are smaller in size than the overall volume of the leafy body of the fully grown vegetables, so as to allow harvesting or in any case retrieval and amassing of the vegetables by raising the net from the ground and if necessary rolling up the net.

The use of said net, as will emerge in particular more clearly from the following description, ensures, compared to the cultivation method which uses plastic film, the following advantages:

4) the possibility of cultivating all types of leafy vegetables resulting in a much wider field of application;

5) the possibility of choosing the type of sowing, which may be performed either by the scattering of seeds or by the transplanting of seedlings; the choice of equipment is therefore much greater and many of the operations may also be performed using conventional machines which are not especially designed for one or a few operations; for example, in the case of sowing by scattering of seeds, performed before or after spreading of the net, sowing itself may be performed not only using a conventional sowing machine, but also using other equipment such as a fertiliser spreader, etc.; planning and execution of the operations are therefore simplified;

6) both transplanting and scattering of the seeds may be performed either before or after spreading of the net, depending on the contingent requirements; the choice of operations and planning thereof over time may therefore be adapted to the conditions of the climate and environment and/or the ground.

BRIEF DESCRIPTION OF THE DRAWINGS

The present invention will now be described in detail with reference to the accompanying figures in which.

Figure 1:
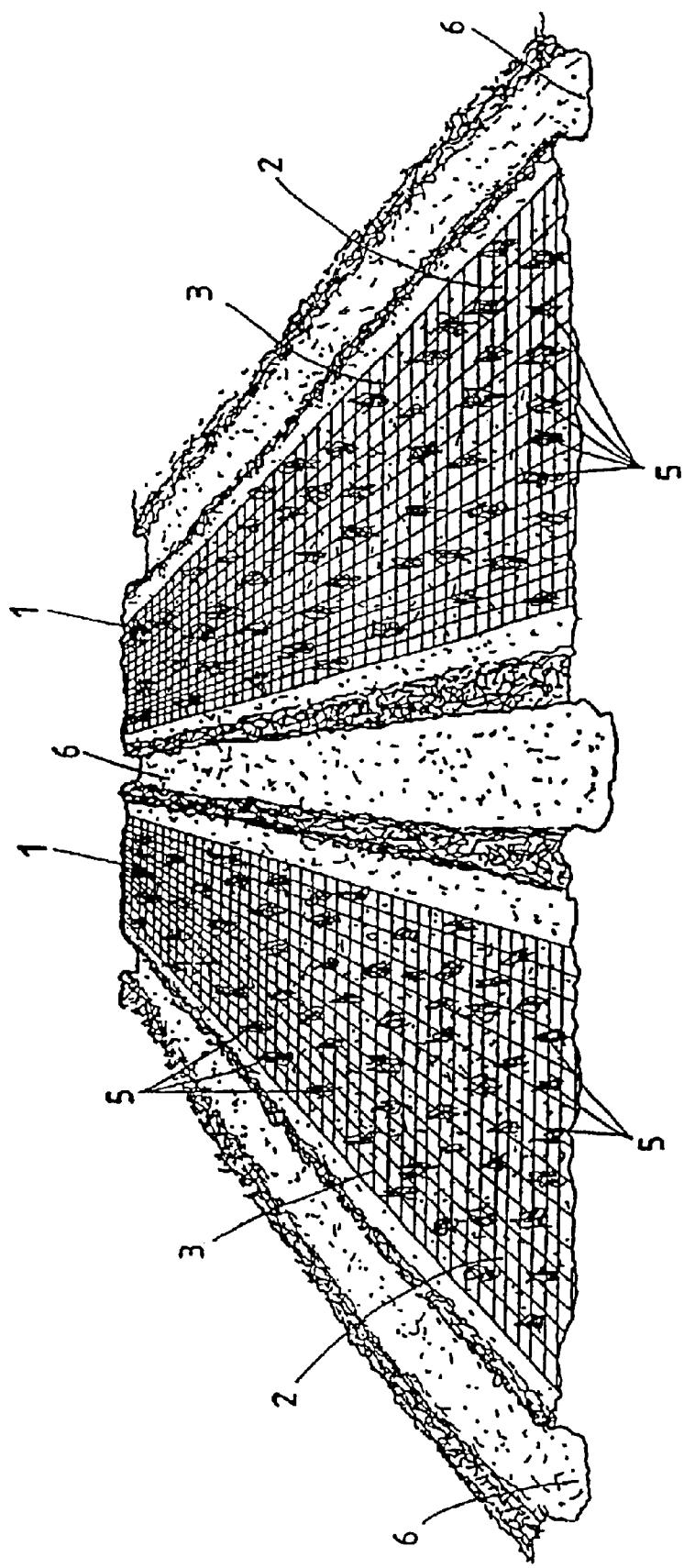
FIG. 1 shows a terrain cultivated using the method according to the present invention during the vegetable growing stage.

DETAILED DESCRIPTION OF A FIRST EXAMPLE OF APPLICATION OF THE METHOD ACCORDING TO THE PRESENT INVENTION

According to a first example of application of the method according to the present invention, sowing is performed by scattering the seeds and spreading of the net is performed in sequence with and at the same time as sowing as will be described below with particular reference to FIGS. 1, 2, 4, and 5.

During a first step, the cultivation bed 1 is prepared with the aim of providing a surface 2 which is flat and levelled and in any case suitable for sowing; this step in practice involves the same operations both if sowing is to be performed by means of transplanting of clodded seedlings and if sowing is to be performed by means of scattering of seeds. Said step comprises operations which are known per se to the person skilled in the art, such as ploughing, machine-hoeing, etc.; this step in any case does not form an essential part of the present invention and therefore will not be described in detail.

Once the cultivation bed 1 has been prepared, scattering of the seeds and spreading of the net 3 is performed; in particular, according to the present example, said operations are performed in sequence and simultaneously using a sowing/spreading machine 10 composed of a sowing machine 11 which is identical to that widely known in agriculture, additionally equipped, at the rear, with a spreading apparatus comprising a roller 12 around which the net 3 to be spread is wound, two spacing wheels 13 (only one of which is visible in FIG. 4) located along the external edges of the net 3 and having essentially the function of keeping the net suitably tensioned widthwise, a second compression roller 14 designed to ensure firm adhesion of the net 3 onto the surface 2 and two ploughshares 15 (only one of which is visible in FIG. 4) also located along the edges of the net 3 and designed to cover said edges with earth so as to obtain fixing of the net to the surface 2. The action of the compression roller 14 essentially has the function of preventing the vegetables from lifting the net during growth and therefore growing underneath the net.

Figure 2:
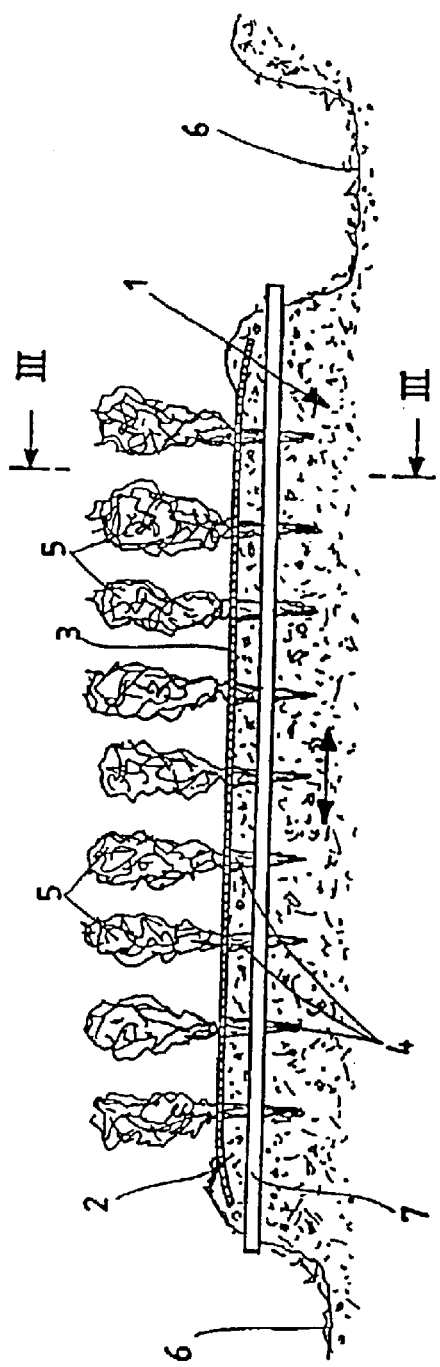
FIG. 2 shows a cross-sectional view of a terrain cultivated using the method according to the present invention during the vegetable growing stage.

Furthermore it is possible to provide beforehand, i.e. before the sowing operations, access paths 6 defining strips of ground (with a width corresponding essentially to that of the net) in which the surface of the cultivation bed is located at a raised level as schematically shown in FIGS. 1 and 2. The provision of said access paths has the purpose of facilitating the operations for "earthing up" the edges of the net (as will be described below) as well as the harvesting operations and all the other operations where operating machines or workers have to pass over the cultivated surface; the presence of the access paths prevents in particular the cultivated vegetables from being damaged in any way by the tyres or the tracks of self-propelled machines and the operations of the cultivation cycle from being hindered or in any way complicated by the vegetables.

The construction of the abovementioned access paths, which may be performed for all the examples of application of the method according to the present invention, is also performed using techniques which are known to the person skilled in the art and will therefore not be described in detail in the present patent application.

It should be noted in particular that the width of the access paths is chosen depending on the width of the tyres and/or the tracks of the self-propelled equipment or operating machines which are to be used (harvesting machines, tractors, etc.), while their distance corresponds essentially to the width of the harvesting net which, in turn, is chosen according to the span of said harvesting machines.

FIGS. 1 and 2 show the ground once the sowing/spreading operations described above have been completed during an intermediate stage of the vegetable growth cycle.

Figure 3:
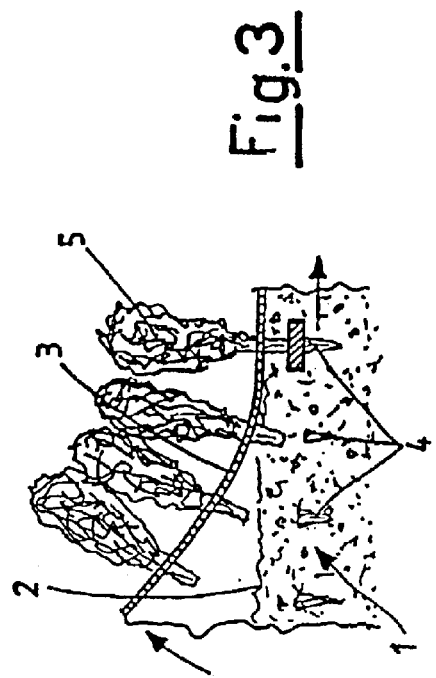
FIG. 3 shows a detail of the operation of harvesting the vegetables according to the method of the present invention.

The step involving harvesting of the fully grown vegetables essentially envisages the operations of cutting the roots of the vegetables (FIG. 3), retrieving the net 3 and then raising, from the ground, the vegetables retained by the meshes of the net and separation of the vegetables from the net 3.

According to a preferred method of harvesting (schematically shown in FIGS. 4 and 5 and applicable to all the examples of application of the cultivation method according to the present invention), the abovementioned operations are performed mechanically with the aid of an operating machine 16; a cutting apparatus 7 located at the front of the machine 16 cuts the roots 4 of the vegetables to be harvested; by means of a winding roller 20, the speed of rotation of which is adapted to the speed of movement of the harvesting machine so as to keep the harvesting net suitably tensioned, the net is wound up and then raised from the ground (it should be noted that this operation is possible without prior removal of the earth covering the edges) so that the vegetables, retained in its meshes, are retrieved and conveyed on a first conveyor belt 17; a beating roller 18, rotating at an adjustable speed and essentially comprising blades of plastic material striking the roots of the vegetables, separates the latter from the net. The vegetables are thus conveyed by falling onto a second conveyor belt 19 from where they may be collected by an operator and arranged in suitable containers (21).

It should be noted, however, that in particular situations, such as for example conditions of persistent rain or bad weather, other harvesting methods are applicable, such as, for example, manual retrieval of the net.

DETAILED DESCRIPTION OF A FEW PARTICULAR EXAMPLES OF APPLICATION OF THE CULTIVATION METHOD ACCORDING TO THE PRESENT INVENTION

According to a first particular example of application of the cultivation method according to the present invention, sowing is performed by scattering the seeds and spreading of the net is performed after sowing.

Figure 4:
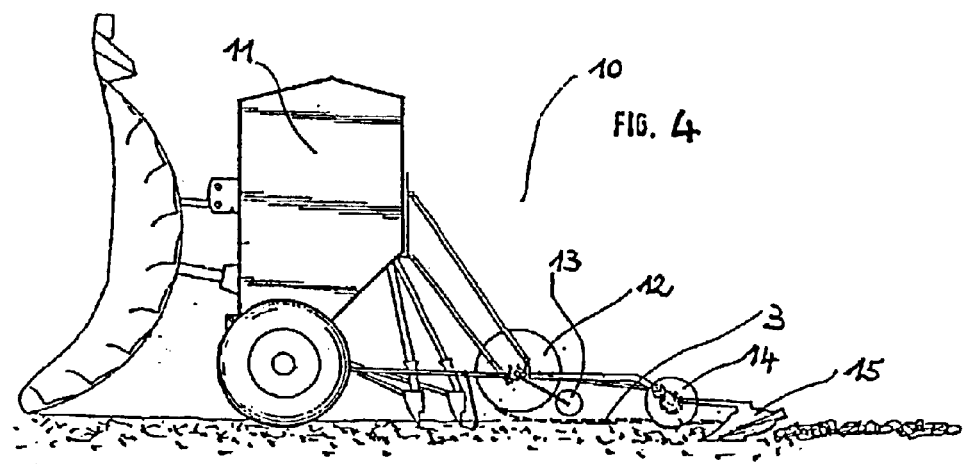
FIG. 4 shows a combined sowing/transplanting/net-spreading machine used in the method according to the present invention.
Figure 5:
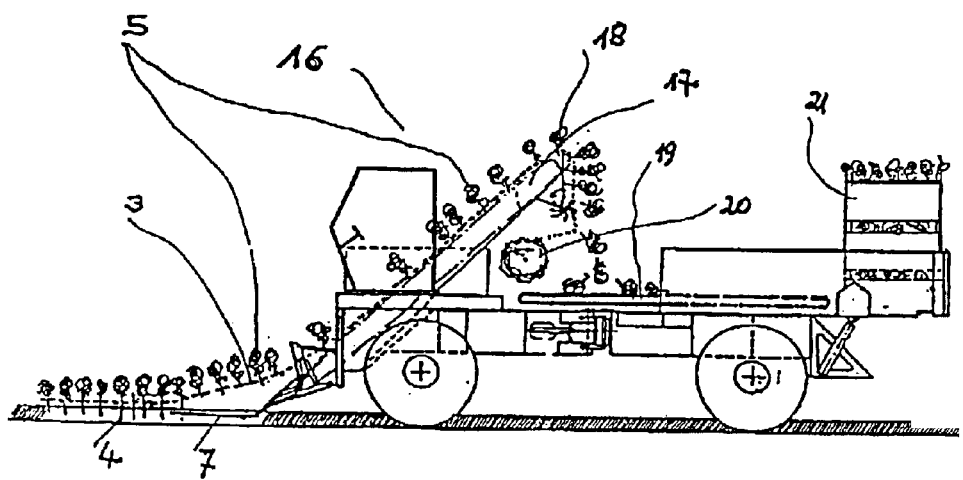
FIG. 5 shows a harvesting machine used in the method according to the present invention.
Figure 6A:
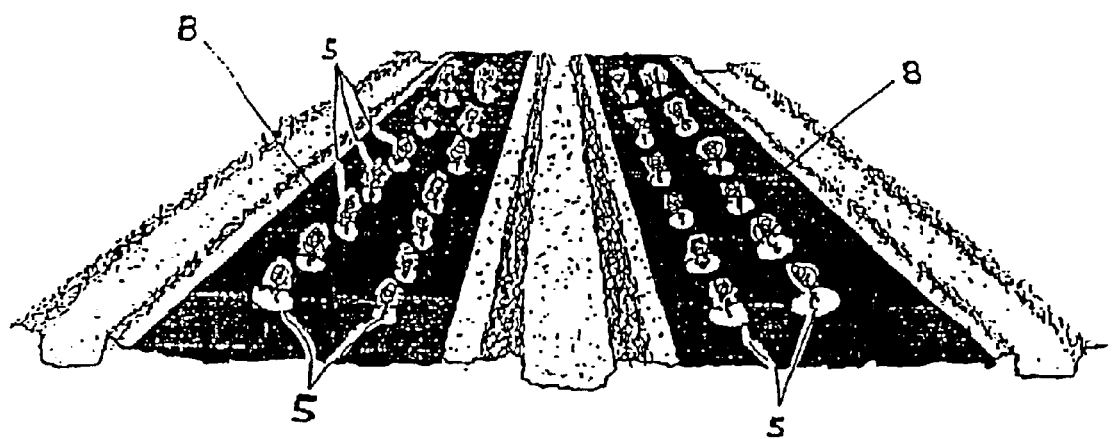
FIG. 6 shows a terrain cultivated using the known cultivation method which envisages the spreading of a plastic film.
Figure 6B:
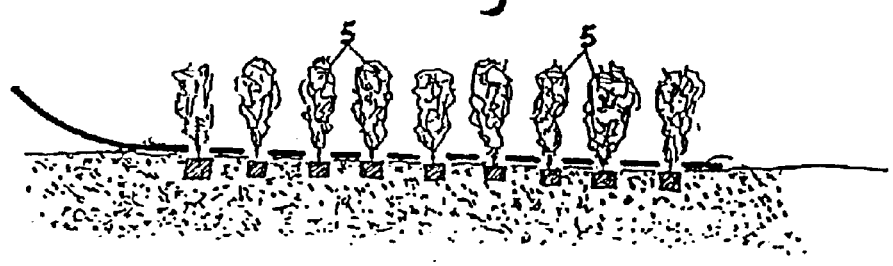

Consequently, sowing may be performed using any method and using any machine from among those which are known to the person skilled in the art and suitable for scattering products in granular form; for example, sowing could be performed using the broadcast method, manually or by means of a fertiliser spreader or using a conventional drill sowing machine as already described with reference to FIG. 4.

Spreading of the net may also be performed in different ways; for example, it may be spread manually with earthing-up of the edges also being performed by hand. Alternatively, it may be possible to use a spreading apparatus, for example of the type which is schematically shown in FIG. 4, applied directly to a tractor.

Consequently there is also a greater possibility for planning and diversification of the operations envisaged.

In this case also, as in the case of the first example described, it is possible to perform any harvesting method which involves retrieval and raising of the net 3; for example, it is possible to use mechanical methods, as described hereinabove. Other systems for retrieval of the net falling within the scope of the present invention may, however, be applied.

According to a further example of application of the cultivation method according to the present invention, sowing may be performed by scattering the seeds, but spreading of the net is performed prior to sowing. In this case the operations for spreading of the harvesting net correspond essentially to those described with reference to the first particular example of application of the method according to the present invention described above; namely, these operations may be performed mechanically or manually or in any other way considered appropriate. Sowing may also be performed in different ways, for example manually, mechanically by means of the broadcast method or using a conventional drill sowing machine. In the latter case, however, the distribution apparatus of the sowing machine must be prevented from getting caught up with the net which has already been spread.

According to the present example, covering of the seeds with earth is performed by passing over the cultivation bed already covered by the net with frictional contact parts such as brushes or the like. In this case, also, a greater operational flexibility is achieved.

Harvesting may be performed using any one of the methods already mentioned and falling within the scope of the present invention.

According to another particular example of application of the cultivation method according to the present invention, sowing is performed by transplanting clodded seedlings and spreading of the net is performed in sequence with and at the same time as transplanting.

This example corresponds essentially to the example already described according to which spreading of the net is performed in sequence with and at the same time as scattering or distribution of the seeds, with the sole difference that, in the case of the present example, sowing is performed by transplanting clodded seedlings. The sowing machine (10) schematically shown in FIG. 4 is replaced by a transplanting machine at the rear of which a net spreading apparatus of the type schematically shown in FIG. 4 is fitted.

In the case of this variant also, which allows application of the cultivation method according to the present invention to all types of so-called transplantable vegetables such as lettuce and the like, it is possible to use any one of the harvesting methods from among those falling within the scope of the invention and already described.

According to yet another particular example of application of the cultivation method according to the present invention, spreading of the net is performed after transplanting of the seedlings.

In particular, sowing is performed by transplanting the seedlings using any one of the transplanting methods known in agriculture (mechanised, mechanical, etc.); the net is then spread subsequently using the method considered most appropriate.

In this case the meshes of the net must have dimensions such as not to damage the transplanted seedlings. It has been found that, while in the case of sowing by means of scattering of seeds the best results are obtained using a net with square meshes of 3 cm along each side, in the case of transplanting the best results are obtained using a net having rectangular meshes measuring 10 cm and 8 cm along the sides; in this way, in fact, the percentage of transplanted seedlings damaged by the net does not exceed 90% of the total of the transplanted seedlings, whereas no drawbacks of any kind were noted during harvesting.

This particular application of the present invention offers the considerable advantage that spreading of the net may be performed once transplanting has been completed; the machines required for the various operations may therefore be advantageously used during different steps, with a considerable reduction both in the number of operators required for operation of said machines and in the costs. Obviously, in this case also, all the harvesting and net retrieval systems falling within the scope of present invention may be used.

According to a last particular example of application of the method according to the present invention, transplanting of the clodded seedlings is performed after spreading of the net.

This variant offers the advantage that the most appropriate method for spreading the net (i.e. manual, mechanised, etc.) may be chosen.

On the other hand, transplanting is possible only using so-called "pelican" transplanting machines of the type used in the known cultivation method as described above envisaging spreading of the plastic film, said machines allowing insertion of the clodded seedlings between the meshes of the net.

This variant also allows the use of any harvesting method from among those mentioned above and falling within the scope of the present invention.

Whereas the present invention has been described with particular reference to certain particular examples, it is understood that the, scope of the invention is not limited to these examples.

For example, although the applications of the method according to the present invention described above refer in particular to the cultivation over large open areas, it is understood that other applications, also fall within the scope of the present invention.

In particular, the method according to the present invention may be equally well advantageously applied to cultivations over small areas and/or in protected environments such as greenhouses and the like.

What is claimed is:

1. A cultivation method for cultivating leafy vegetables, comprising the following steps (a, b, c,):
    a) sowing a surface (2) of a cultivation bed with leafy vegetables (5) having a leafy body;
    b) before, at the same time or after the sowing step, spreading over an upper surface (2) of the cultivation bed a net (3) having meshes which are smaller in size than an overall volume of the leafy body of the vegetables (5), when fully grown;

c) harvesting the vegetables (5) thus sown when fully grown;

so as to allow retrieval and amassing of the vegetables by raising and rolling up the net (3) from the upper surface of the cultivation bed.

2. The cultivation method according to claim 1, wherein said sowing is performed by scattering seeds.

3. The cultivation method according to claim 2, wherein the operations (a, b) of sowing and spreading of the net (3) are performed in sequence and at the same time by using a sowing/spreading machine comprising essentially a sowing machine (11) equipped with a spreading apparatus (12, 13, 14, 15).

4. The cultivation method according to claim 2, wherein said sowing is performed separately from and prior to spreading of the net (3).

5. The cultivation method according to claim 2, wherein said sowing is performed separately from and after spreading of the net (3).

6. The cultivation method according to claim 1, wherein said sowing is performed by transplanting seedlings.

7. The cultivation method according to claim 6, wherein transplanting of the seedlings is performed prior to spreading of the net (3).

8. The cultivation method according to claim 6, wherein transplanting of the seedlings is performed after spreading of the net (3).

9. The cultivation method according to claim 6, wherein transplanting of the seedlings and spreading of the net (3) are performed in sequence and simultaneously by using a transplanting/spreading machine comprising essentially a transplanting machine equipped with a spreading apparatus (12, 13, 14, 15).

10. The cultivation method according to claim 1, wherein by using strips of the net (3) of predefined width and forming access paths (6) along sides of said strips of the net (3), the upper surface (2) of the cultivation bed (2) is formed at a higher level than that of said paths (6).

11. The cultivation method according to claim 1, further including fixing the net (3) to the upper surface (2) of the cultivation bed by covering with earth edges of the net (3).

12. The cultivation method according to claim 11, in which covering of the edges with earth is performed using earth taken from the access paths (6).

13. The cultivation method according to claim 1, wherein said steps (a, b, c) of the method are performed in protected environments.

14. The cultivation method according to claim 1, wherein the harvesting of the vegetables (5) comprises:

a) cutting roots (4) of the vegetables (5) to be harvested;

b) raising the net (3) from the ground; and c) separating the vegetables (5) from the net (3) and amassing or in any case retrieving said vegetables (5).

15. The cultivation method according to claim 14, wherein the net (3) is raised from the ground by rolling up the net (3).

16. The cultivation method according to claim 14, wherein the operations (a, b, c) claimed are performed mechanically by using a harvesting machine (16).

17. The cultivation method according to claim 16, wherein the harvesting machine (16) comprises a cutting apparatus (7) located at the front of the machine (16) which cuts the roots (4) of the vegetables to be harvested; a winding roller (20), with a speed of rotation adapted to speed of movement of the harvesting machine (16) so as to keep the harvesting net (3) suitably tensioned and by means of which the net (3) is wound up and therefore raised from the ground, so that the vegetables (5), retained in its meshes, are retrieved and conveyed on a first conveyor belt (17); a beating roller (18) which rotates at an adjustable speed and comprises essentially blades of plastic material striking the roots (4) of the vegetables (5) and which separates the vegetables (5) from the net (3); a second conveyor belt (19) which is designed to collect the vegetables (5) separated from the net (3) and from which the vegetables (5) are gathered by an operator and arranged in suitable containers (21).

18. A machine (16) for collecting leafy vegetables, designed to perform the harvesting operations claimed in claim 17, comprising:

a cutting apparatus (7) which is located at the front of the machine (16) and which cuts the roots (4) of the vegetables (5) to be harvested; a winding roller (20), with a speed of rotation which is adaptable to speed of movement of the harvesting machine (16) so as to keep the harvesting net (3) suitably tensioned and by means of which the net (3) is wound up and therefore raised from the ground; a first conveyor belt (17) which is designed to retrieve the vegetables (5) retained in the meshes of the net (3); a beating roller (18) which rotates at an adjustable speed and comprises essentially blades of plastic material striking the roots (4) of the vegetables (5) so as to separate the vegetables (5) from the net (3); a second conveyor belt (19) which is designed to collect the vegetables (5) separated from the net (3) and from which the vegetables (5) may be gathered by an operator and arranged in suitable containers (21).

19. A cultivation method for cultivating leafy vegetables, comprising the following steps (a, b, c):

a) sowing a surface (2) of a cultivation bed with leafy vegetables (5) having a leafy body;

b) before, at the same time or after the sowing step, spreading over the surface (2) of the cultivation bed a net (3) having meshes which are smaller in size than an overall volume of the leafy body of the vegetables (5), when fully grown;

c) harvesting the vegetables (5) thus sown when fully grown;

so as to allow retrieval and amassing of the vegetables by raising and rolling up the net (3);

wherein transplanting of the seedlings is performed prior to spreading of the net (3).

* * * * *